United States Patent
Hiromitsu

(10) Patent No.: US 9,746,588 B2
(45) Date of Patent: Aug. 29, 2017

(54) METHOD FOR MANUFACTURING VISIBILITY IMPROVEMENT SHEET, AND VISIBILITY IMPROVEMENT SHEET

(75) Inventor: Masashi Hiromitsu, Fukuyama (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 904 days.

(21) Appl. No.: 13/701,075

(22) PCT Filed: May 30, 2011

(86) PCT No.: PCT/JP2011/062363
§ 371 (c)(1),
(2), (4) Date: Feb. 4, 2013

(87) PCT Pub. No.: WO2011/152345
PCT Pub. Date: Dec. 8, 2011

(65) Prior Publication Data
US 2013/0129981 A1    May 23, 2013

(30) Foreign Application Priority Data

May 31, 2010 (JP) ................................. 2010-124531
May 27, 2011 (JP) ................................. 2011-119299

(51) Int. Cl.
*G02B 5/00* (2006.01)
*B29D 11/00* (2006.01)
(Continued)

(52) U.S. Cl.
CPC ........ *G02B 5/003* (2013.01); *B29D 11/00634* (2013.01); *G02B 5/0247* (2013.01);
(Continued)

(58) Field of Classification Search
CPC ...... G02B 5/223; G02B 5/0247; G02B 5/201; G02B 5/003; B29D 11/00634; B29C 33/42
See application file for complete search history.

(56) References Cited

U.S. PATENT DOCUMENTS

2008/0030882 A1   2/2008   Ichikawa et al.
2008/0303777 A1   12/2008  Inoue et al.
(Continued)

FOREIGN PATENT DOCUMENTS

JP   08-160206 A1   6/1996
JP   2004-037671 A1   2/2004
(Continued)

OTHER PUBLICATIONS

International Search Report and Written Opinion dated Aug. 30, 2011.

*Primary Examiner* — Mathieu Vargot
(74) *Attorney, Agent, or Firm* — Burr & Brown, PLLC

(57) ABSTRACT

Disclosed is a method for manufacturing a visibility improvement sheet that comprises light absorbing portions having a substantially rectangular cross-section and can realize a high contrast while maintaining a view angle. The visibility improvement sheet is manufactured by forming light transparent portions juxtaposed to each other at predetermined intervals to form grooves having a substantially rectangular cross section juxtaposed to each other between the light transparent portions, filling the grooves with an ink composition comprising a transparent ionizing radiation curable resin composition and colored fine particles, and curing the ink composition in such a state that fine air bubbles are randomly dispersed in the filled ink composition.

9 Claims, 7 Drawing Sheets

(51) Int. Cl.
*G02B 5/22* (2006.01)
*G02B 5/02* (2006.01)
*G02B 5/20* (2006.01)
B29C 33/42 (2006.01)
G02F 1/1335 (2006.01)

(52) U.S. Cl.
CPC .............. *G02B 5/201* (2013.01); *G02B 5/223* (2013.01); *B29C 33/42* (2013.01); *G02F 1/133504* (2013.01); *Y10T 428/24496* (2015.01)

(56) References Cited

U.S. PATENT DOCUMENTS

| | | |
|---|---|---|
| 2009/0091824 A1 | 4/2009 | Yamashita et al. |
| 2011/0027474 A1 | 2/2011 | Ichikawa et al. |

FOREIGN PATENT DOCUMENTS

| | | |
|---|---|---|
| JP | 2006-085050 A1 | 3/2006 |
| JP | 2006-119365 A1 | 5/2006 |
| JP | 2008-242232 A1 | 10/2008 |
| JP | 2009-098615 A1 | 5/2009 |
| JP | 2009-244749 A1 | 10/2009 |
| WO | 2006/082870 A1 | 8/2006 |
| WO | 2006/090784 A1 | 8/2006 |
| WO | 2010/143335 A1 | 12/2010 |

METHOD FOR MANUFACTURING VISIBILITY IMPROVEMENT SHEET, AND VISIBILITY IMPROVEMENT SHEET

BACKGROUND OF THE INVENTION

1. Field of the Invention

The present invention relates to a method for manufacturing a visibility improvement sheet. More particularly, the present invention relates to a method for manufacturing a visibility improvement sheet that is installed on a front surface of display devices, exerts, for example, a function of preventing a lowering in properties of the display devices, especially a lowering in properties caused by a lowering in contrast, glaring, image reflection, and the like upon exposure of the display device to external light, and a function of effectively diffusing or focusing effective light of the display device to regulate the view angle, and a visibility improvement sheet obtained by the method.

2. Description of Related Art

In liquid crystal display devices, a broad view angle is generally preferred from the viewpoint of allowing viewers to observe good images from any position. On the other hand, in liquid crystal display devices used, for example, in work on commuter trains or in liquid crystal display devices installed in public places, such as ATMs, users of the liquid crystal display devices do not sometimes wish that images on the screen are seen by people around them. In this case, a peep preventive function is required that protects privacy, that is, allows only the viewers of the liquid crystal display devices to see images on the screen while others cannot see the images on the screen. Further, in on-vehicle liquid crystal display devices such as car navigation systems, images of screens in liquid crystal display devices are cast on windshields during nighttime or the like, leading to a phenomenon that cuts off the view. Accordingly, a reflection preventive function is demanded, and, to this end, the regulation of a light outgoing angle is desired.

To meet this demand, for example, Japanese Patent Application Laid-Open No. 119365/2006 (patent document 1) proposes a louver-type visibility improvement sheet having a structure comprising light transparent layers alternating with light shielding layers. This document discloses that the light shielding layer is formed of a material for constituting a light transparent layer, into which a filler such as carbon black or carbon fibers has been mixed.

On the other hand, the louver-type visibility improvement sheet simply cuts oblique image light. Accordingly, this visibility improvement sheet, when used for some types of display devices, disadvantageously reduces diffused light of image light that should arrive at the viewer, sometimes leading to a lowering in brightness of the display screen.

In order to solve the above problems, a proposal has been made in which a visibility improvement sheet that can shield external light to improve contrast and, at the same time, can reduce the occurrence of double images is provided between a light source and a liquid crystal panel in liquid crystal display devices. Various structures of the visibility improvement sheet for use in this application have been proposed. One example thereof is a visibility improvement sheet having a structure that comprises lenses having a trapezoidal cross section arranged at predetermined intervals and wedge-shaped portions that are provided between adjacent lenses and are filled, for example, with a material having a lower refractive index than the lenses and a carbon pigment (for example, Japanese Patent Application Laid-Open No. 85050/2006: patent document 2).

In the manufacture of visibility improvement sheets, a method has been adopted that comprises filling the wedge-shaped portions with a composition comprising a lens material such as an ionizing radiation curable resin and colored resin beads mixed into the resin and irradiating the composition with an ionizing radiation to cure the composition and thus to form light absorbing portions (for example, International Application WO 2006/090784: patent document 3).

PRIOR ART DOCUMENTS

Patent Documents

Patent document 1: Japanese Patent Application Laid-Open No. 119365/2006

Patent document 2: Japanese Patent Application Laid-Open No. 85050/2006

Patent document 3: International Application WO 2006/090784

SUMMARY OF THE INVENTION

The light absorbing portions in the conventional visibility improvement sheets are generally substantially triangle in cross section, and the oblique side of the substantially triangle has a given angle to a direction normal to the surface of the visibility improvement sheet. The light absorbing portions have been formed by filling the above ink composition with colored resin beads mixed thereinto into wedge-shaped openings corresponding to the substantially triangle bottom and curing the resin. In recent years, in addition to the visibility improvement sheet comprising light absorbing portions having a substantially triangle cross section, a visibility improvement sheet comprising light absorbing portions having a substantially rectangular cross section, the light absorbing portions having an angle of the oblique side close to 0 (zero) degree to a direction normal to the surface of the visibility improvement sheet, has been proposed.

The view angle improvement sheet comprising light absorbing portions having a substantially rectangular cross section can realize an improvement in contrast over the conventional visibility improvement sheet having a substantially triangular cross section, but on the other hand, difficulties are encountered in maintaining the view angle due to the structure similar to the louver-type structure comprising light transparent layers alternating with light shielding layers.

The present inventors have now found that a visibility improvement sheet that can realize an excellent contrast while maintaining a view angle can be realized by, when an ink composition with colored resin beads mixed thereinto is filled into grooves having a substantially rectangular cross section followed by curing the resin, incorporating air bubbles in the filled ink composition at a predetermined ratio and curing the ink to form light absorbing portions. The present invention has been made based on such finding.

Accordingly, an object of the present invention is to provide a method for manufacturing a visibility improvement sheet that comprises narrow-line-width light absorbing portions having a substantially rectangular cross section and can realize an excellent contrast while maintaining a view angle.

Another object of the present invention is to provide a visibility improvement sheet obtained by the above manufacturing method.

A further object of the present invention is to provide a display device comprising the above visibility improvement sheet.

According to the present invention, there is provided a method for manufacturing a visibility improvement sheet comprising: light transparent portions juxtaposed to each other at predetermined intervals; and light absorbing portions having a substantially rectangular cross section juxtaposed to each other between the light transparent portions, the method comprising:

forming light transparent portions juxtaposed to each other at predetermined intervals to form grooves having a substantially rectangular cross section juxtaposed to each other between the light transparent portions;

filling the grooves with a ink composition comprising a transparent ionizing radiation curable resin composition and colored fine particles;

and curing the ink composition in such a state that fine air bubbles are randomly dispersed in the filled ink composition.

In a preferred embodiment of the present invention, the fine air bubbles have a mean diameter of 1 to 10 μm.

In a preferred embodiment of the present invention, the fine air bubbles are contained in at least one of the grooves having a substantially rectangular cross section in an across-the-width cross section of the visibility improvement sheet.

In a preferred embodiment of the present invention, 1 to 5 fine air bubbles are contained in at least one of the grooves having a substantially rectangular cross section in an across-the-width cross section of the visibility improvement sheet.

In a preferred embodiment of the present invention, the ink composition is cured in such a state that the fine air bubbles are present as discontinuous closed air bubbles in the grooves having a substantially rectangular cross section.

In a preferred embodiment of the present invention, the light absorbing portions having a substantially rectangular cross section have an oblique side that makes an angle of 0 to 3 degrees with a direction normal to the surface of the visibility improvement sheet.

In a preferred embodiment of the present invention, the colored fine particles are formed of resin beads comprising a resin in which carbon black has been incorporated.

In a preferred embodiment of the present invention, the carbon black has a mean particle diameter of 10 to 500 nm.

In a preferred embodiment of the present invention, the ionizing radiation curable resin composition comprises compounds selected from polyester resins, polyether resins, acrylic resins, epoxy resins, urethane resins, alkyd resins, spiroacetal resins, polybutadiene resins, polythiolpolyene resins, and oligomers or prepolymers of (meth)acrylates of polyfunctional compounds selected from polyhydric alcohols.

In a preferred embodiment of the present invention, the ink composition has a viscosity of 500 to 5,000 mPa·s.

According to another aspect of the present invention, there is provided a visibility improvement sheet obtained by the above method, the visibility improvement sheet comprising: light transparent portions juxtaposed to each other at predetermined intervals; and light absorbing portions having a substantially rectangular cross section juxtaposed to each other between the light transparent portions, voids formed of fine air bubbles being contained in at least one of the light absorbing portions.

In a preferred embodiment of the present invention, 1 to 15 voids formed of fine air bubbles are contained in at least one of the light absorbing portions.

In a preferred embodiment of the present invention, 1 to 30% by volume of the whole volume of the light absorbing portions is accounted for by the voids.

According to a further aspect of the present invention, there is provided a display device comprising the above visibility improvement sheet.

In the present invention, in forming light absorbing portions juxtaposed to each other between the light transparent portions, an ink composition is filled into grooves having a substantially rectangular cross section, and the ink composition is cured in such a state that fine air bubbles are randomly dispersed in the filled ink composition. Since voids formed of fine air bubbles are randomly formed in the formed light absorbing portions having a substantially rectangular cross section, an excellent contrast can be realized while maintaining a view angle despite that the visibility improvement sheet comprises light absorbing portions having a substantially rectangular cross section.

DETAILED DESCRIPTION OF THE INVENTION

<Method for Manufacturing Visibility Improvement Sheet>

A method for manufacturing a visibility improvement sheet according to the present invention, comprising: light transparent portions juxtaposed to each other at predetermined intervals; and light absorbing portions having a substantially rectangular cross section juxtaposed to each other between the light transparent portions, the method comprising:

forming light transparent portions juxtaposed to each other at predetermined intervals to form grooves having a substantially rectangular cross section juxtaposed to each other between the light transparent portions; filling the grooves with a ink composition comprising a transparent ionizing radiation curable resin composition and colored fine particles; and curing the ink composition in such a state that fine air bubbles are randomly dispersed in the filled ink composition. The steps will be described in sequence with reference to the accompanying drawings.

Figure 1:
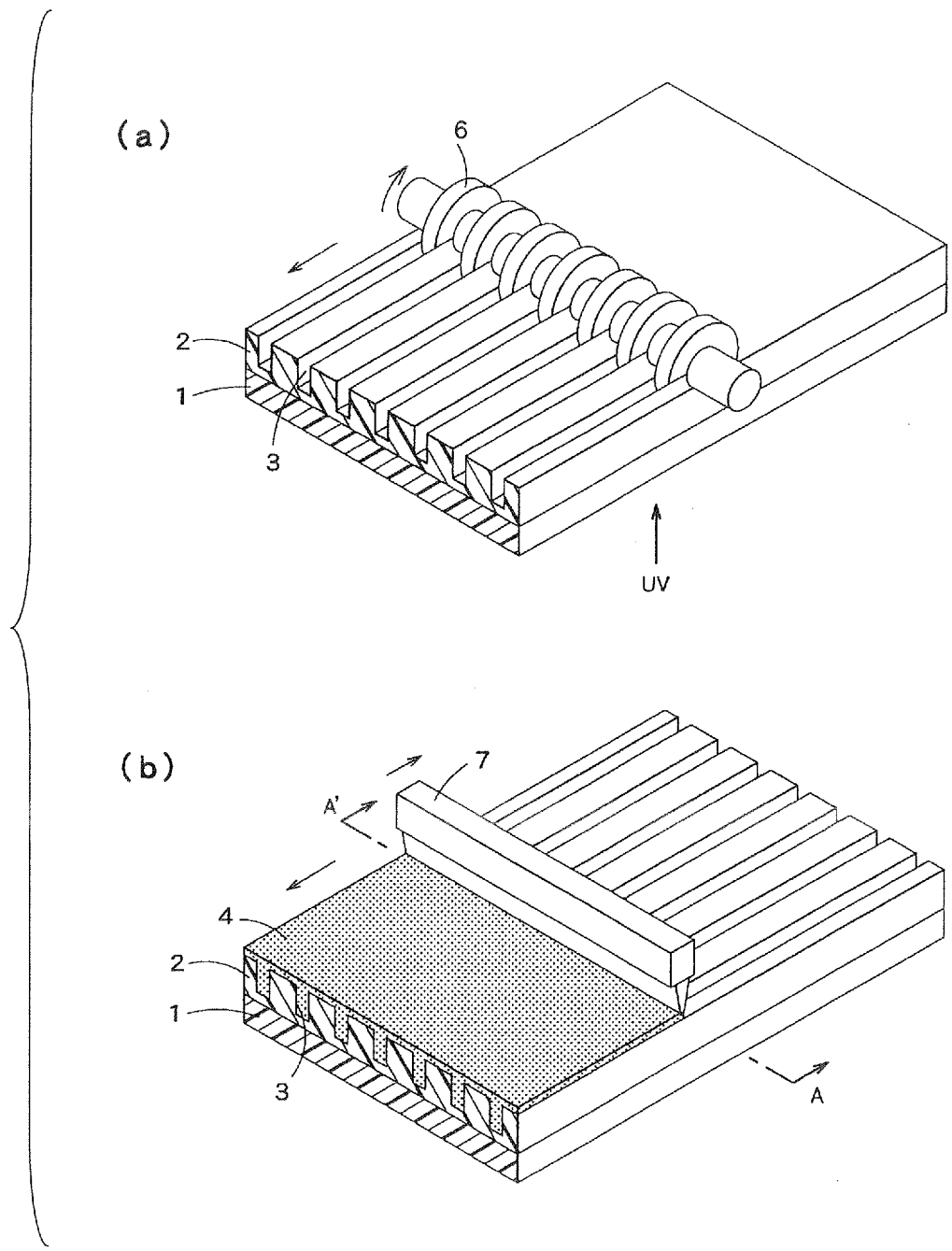
FIGS. 1a and 1b are a schematic process view illustrating a method for manufacturing a visibility improvement sheet in one embodiment of the present invention.

FIG. 1 shows a schematic process of the method for manufacturing a visibility improvement sheet according to the present invention. At the outset, a plurality of light transparent portions 2 having a substantially rectangular cross section in a layer thickness direction are formed on a base material 1 (FIG. 1A). The light transparent portions 2 are an element having a substantially rectangular cross section and are arranged so that one sheet surface side is an upper side while the other sheet surface side is a lower side.

The base material used in the above step is a layer that functions as a base for the formation of the light transparent portions 2 and the light absorbing portions 5. Transparent resin films, transparent resin plates, transparent resin sheets, and transparent glass may be used as the base material. Suitable transparent resin films include films of polyesters such as cellulose triacetate (TAC) and polyethylene terephthalate (PET), diacetyl cellulose, cellulose acetate butyrate, polyether sulfone, polyacrylic resins, polyurethane resins, polyesters, polycarbonates, polysulfones, polyethers, polymethyl pentenes, polyether ketones, and (meth)acrylonitriles. Among them, polyester films are preferred. Polyester films include, in addition to polyethylene terephthalate, polybutyrene terephthalate, polynaphthalene terephthalate, and polytrimethylene terephthalate.

The light transparent portions 2 may be formed by methods that may vary depending upon the type of resins used. For example, when the light transparent portions are formed using transparent thermoplastic resins, light transparent portions having a desired shape can be formed, for example, by hot pressing in which a thermoplastic resin is pressed by a heated mold, injection molding, or casting in which a thermoplastic resin monomer is poured into a mold followed by polymerization and solidification. On the other hand, when ionizing radiation curable resins, particularly ultraviolet curable resins are used, light transparent portions having a desired shape can be formed by a method in which the resin is poured into a mold and is irradiated with ultraviolet light, that is, the so-called UV method. Among these methods, the UV method is suitable in the present invention because of its high mass productivity. According to the UV method, as shown in FIG. 1A, arranged light transparent portions 2 as a unit can be continuously formed with a roll-shaped mold 6.

Grooves 3 that have a substantially rectangular cross section and are juxtaposed to each other are formed between the light transparent portions by forming the plurality of light transparent portions 2 on the base material. Subsequently, an ink composition 4 comprising a transparent ionizing radiation curable resin composition and colored fine particles is filled into the juxtaposedly provided grooves 3 having a substantially rectangular cross section (FIG. 1B). The ink composition may be filled into the wedge-shaped grooves by dropping with a dispenser, coating with a die head, or filling with a finisher roll. Among these methods, when ink marks are noticeable due to poor flowability of the ink, coating with a die head 7 as shown in FIG. 1B is suitable. The ink composition is filled into the substantially trapezoidal or substantially rectangular grooves 3 by the above ink filling methods.

Figure 2:
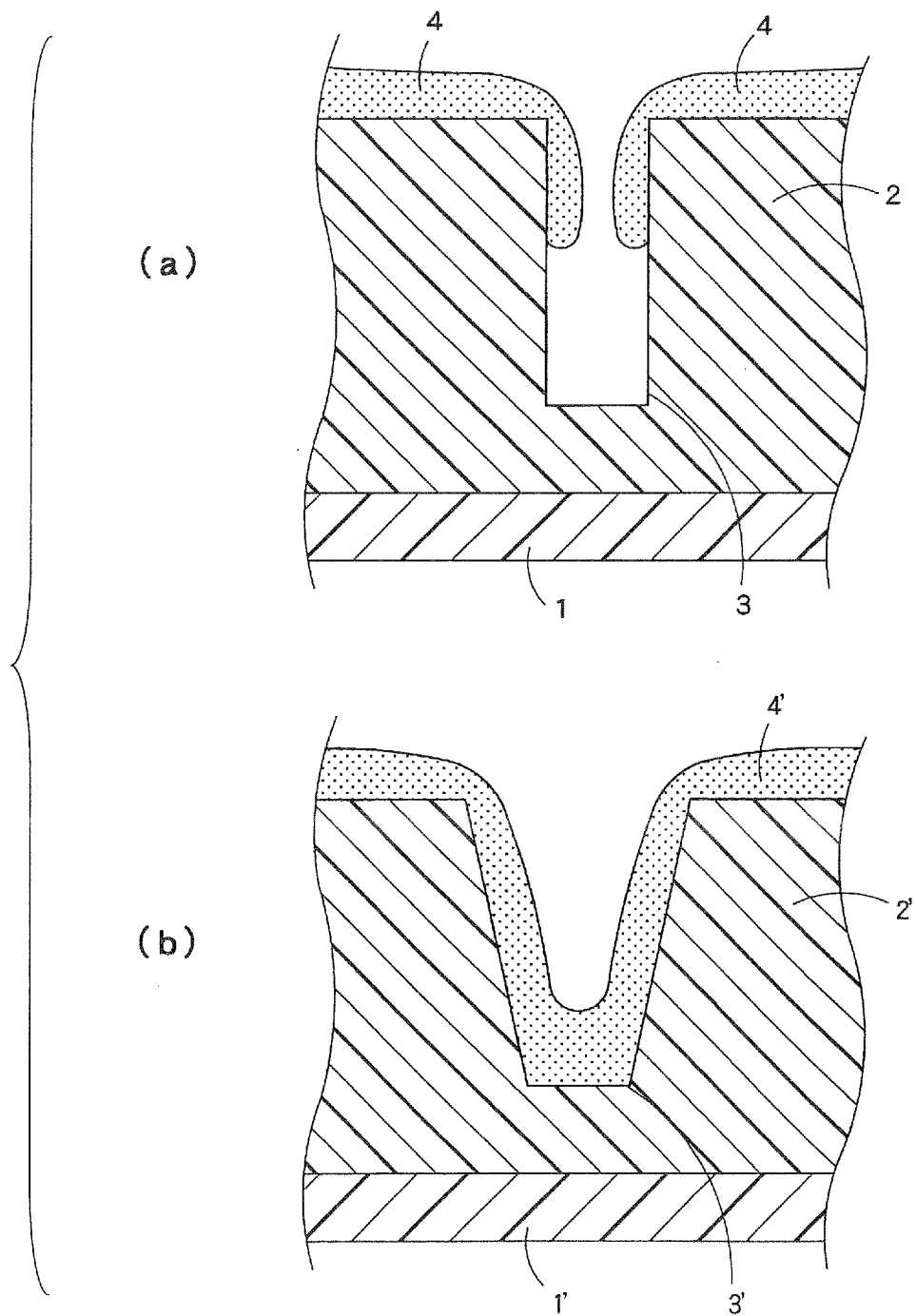
FIGS. 2a and 2b are a schematic view illustrating a method for manufacturing a visibility improvement sheet according to the present invention and a conventional manufacturing method.

Specifically, as shown in FIG. 2B, when conventional light absorbing portions having a substantially trapezoidal or substantially triangular cross section are formed, since the grooves that, after ink filling, serve as light absorbing portions have a wedge-shaped cross section, the oblique side of the wedge shape has a certain angle to a direction normal to the surface of the visibility improvement sheet. Accordingly, the ink composition is filled into the grooves while flowing-down on the oblique side, and, thus, air is unlikely to be mixed into the ink composition. By contrast, as shown in FIG. 2A, when light absorbing portions having a substantially rectangular cross section are formed, the grooves that, after ink filling, serve as light absorbing portions have a substantially rectangular cross section, and the angle of the side surface of the grooves to a direction normal to the surface of the visibility improvement sheet is approximately 0 to 3 degrees. Further, when the grooves have a substantially rectangular cross section, the width of the groove opening (approximately 8 to 12 μm) is smaller than that of the conventional grooves having a wedge-shaped cross section. Accordingly, it is considered that, when the ink composition is filled by the above filling methods, air bubbles are necessarily mixed into the filled ink composition.

Figure 3:
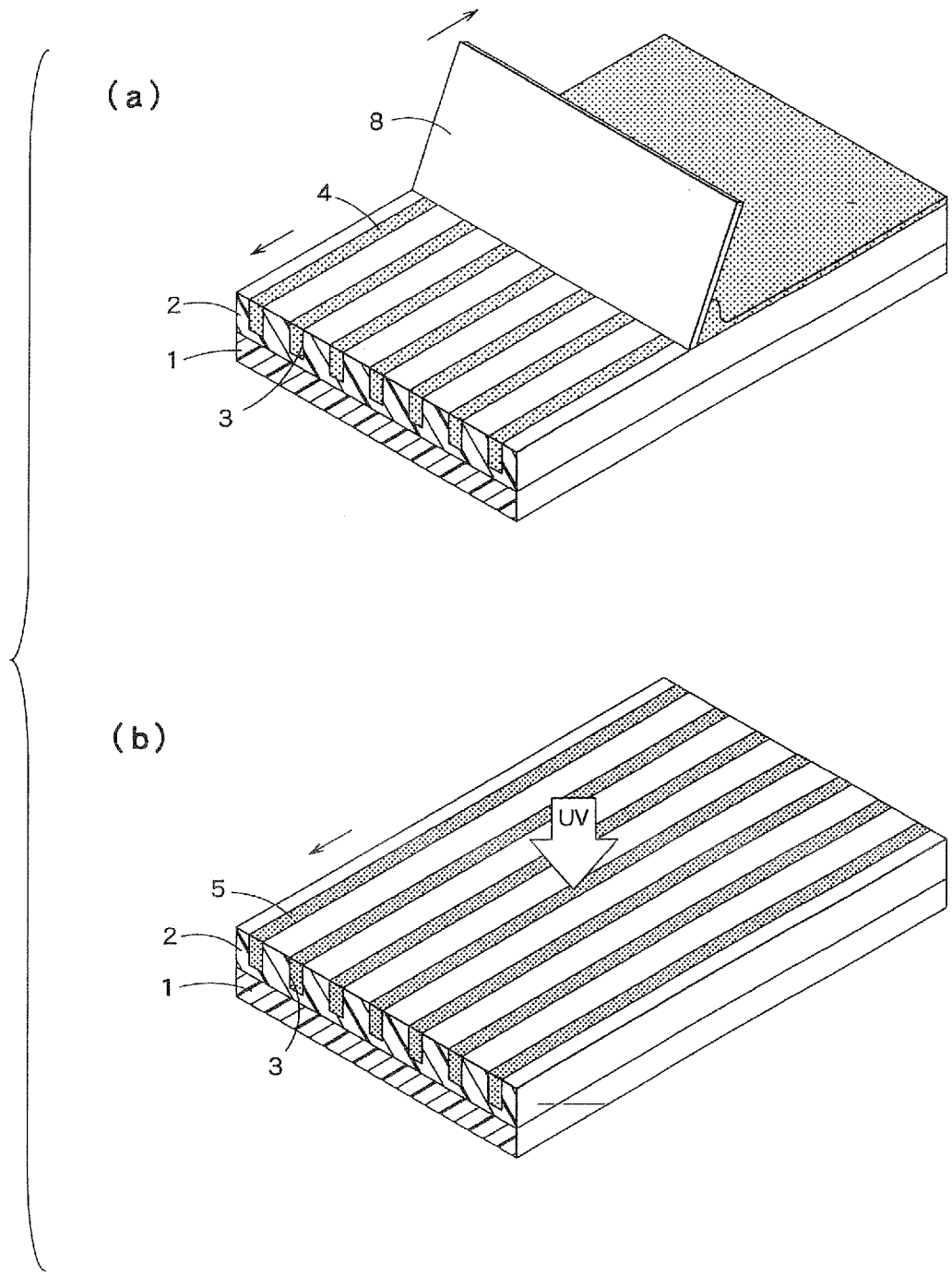
FIGS. 3a and 3b are a schematic process view illustrating a method for manufacturing a visibility improvement sheet in one embodiment of the present invention.

After filling of the ink composition 4 into the grooves 3 having a substantially rectangular cross section, that is, cavities 3 provided between the plurality of light transparent portions 2, an excess ink composition 4 is scraped off to fill the grooves 3 having a substantially rectangular cross section with the ink composition 4 (FIG. 3A). In this case, the air bubbles contained in the ink composition grow together and ascend towards a direction opposite to the gravity while increasing the volume. Accordingly, the content of the air bubbles decreases with closeness to the bottom of the grooves. The size of the air bubbles at a time just before curing of the resin is preferably approximately 1 to 10 μm in terms of mean diameter. The mean diameter of the air bubbles means the mean diameter of spheres when the air bubbles are spherical. When the air bubbles are not spherical as in the case where air bubbles are adhered to the wall of the grooves, the mean diameter means the mean maximum width of the air bubbles in the cross section in the direction of the sheet width. Accordingly, when the air bubbles are in contact with both walls of the grooves, the mean diameter of the air bubbles are identical to the mean groove width.

The amount of air (air bubbles) mixed into the ink composition, easiness on coming together of air bubbles contained in the ink composition, the ascending speed of the air bubbles and the like are influenced by the viscosity of the ink composition. In the present invention, the viscosity of the ink composition is preferably in the range of 500 to 5,000 mPa·s. When the ink viscosity is not less than 5,000 mPa·s, air can easily be included in the ink composition when filled into the grooves, but on the other hand, in some cases, the viscosity is so high that the ink composition cannot be filled to the bottom of the grooves. Further, as described later, the excess ink cannot be scraped off well. When the ink viscosity is less than 500 mPa·s, air bubbles contained in the ink composition can easily come together, but on the other hand, the speed of ascending in a direction opposite to the gravity is increased and, consequently, in some cases, air bubbles are no longer contained in the ink composition when the ink composition is cured. The viscosity of the ink composition refers to a value as measured under an environment of 25° C. with a B-type (Brookfield) viscometer.

In order to scrape off the ink well, as shown in FIG. 3A, a continuous scraper using a doctor blade 8, a wiping roll or the like is adopted. When the ink viscosity is less than 500 mPa·s, the ink can be scraped off well, but on the other hand, difficulties are encountered in filling the ink composition into the wedge-shaped grooves. When the ink viscosity is more than 5,000 mPa·s, the flowability of the ink is poor and ink marks are noticeable, sometimes making it difficult to form desired light absorbing portions.

The ink composition used in this step will be described. The ink composition comprises a transparent ionizing radiation curable resin composition and colored fine particles as indispensable ingredients. Ionizing radiation curable resin compositions used in conventional visibility improvement sheets, view angle improvement sheets and the like are usable as the ionizing radiation curable resin composition. For example, resins containing acrylate functional groups are suitable for use. Specific examples thereof include relatively low-molecular weight polyester resins, polyether resins, acrylic resins, epoxy resins, urethane resins, alkyd resins, spiroacetal resins, polybutadiene resins, polythiolpolyene resins, and oligomers or prepolymers of (meth)acrylates of polyfunctional compounds such as polyhydric alcohols. Resins for constituting the light absorbing portions vary depending upon the material constituting the light transparent portions of the visibility improvement sheets, and resins having a lower refractive index than the material constituting the light transparent portions may be selected from these resins.

Reactive diluents may be added to the resin composition. Such reactive diluents include monofunctional monomers such as ethyl(meth)acrylate, ethylhexyl(meth)acrylate, styrene, methylstyrene, N-vinylpyrrolidone and polyfunctional monomers such as trimethylolpropane tri(meth)acrylate, hexanediol(meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

When an ionizing radiation curable resin is converted to an ultraviolet curable resin composition, photopolymerization initiators, for example, acetophenones, benzophenones, Michler's benzoyl benzoate, α-amyloxime ester, tetramethylthiuram monosulfide, or thioxanthones, and phosenitzers, for example, n-butylamine, triethylamine, or poly-n-butylphosphine may be mixed into the composition. In the present invention, mixing of urethane acrylate as an oligomer and dipentaerythritol hexa(meth)acrylate as a monomer is particularly preferred.

Regarding the colored fine particles used in the present invention, colored fine particles that can selectively absorb specific wavelengths depending upon characteristics of image light may be used as resin beads and glass beads. Fine particles into which colorants, for example, carbon black, graphite, fibrous carbon, metal salts such as black iron oxide, dyes, and pigments have been kneaded may be used. The use of resin beads is preferred from the viewpoint of easily kneading the colorant thereinto. Suitable resin beads include melamine beads, acrylic beads, acryl-styrene beads, polycarbonate beads, polyethylene beads, polystyrene beads, and polyvinyl chloride beads. Urethane crosslinked fine particles, and silicone beads are also suitable for use. Preferably, these resin beads have a refractive index that is different by about 0.1 from that of the ionizing radiation curable resin composition. The resin into which the colorant is to be kneaded may also be a transparent resin. However, resins colored, for example, with pigments or dyes are preferred, and the resins may selectively absorb specific wavelengths depending upon the characteristics of image light but are preferably black-colored resin beads.

Among the above colorants, carbon black is suitable for use. The amount of the carbon black kneaded into the resin beads is approximately 0.1 to 0.7 part by weight, preferably 0.15 to 0.5 part by weight, more preferably 0.2 to 0.35 part by weight, based on one part by weight of the resin beads. When the amount of the carbon black kneaded is larger than 0.7 part by weight, the resin beads are likely to be broken. On the other hand, when the amount of the carbon black kneaded is smaller than 0.1 part by weight, in some cases, colored fine particles having desired blackness cannot be obtained. Carbon black having a mean particle diameter of 10 to 500 nm is suitable for use. Examples thereof include furnace black, acetylene black, channel black, thermal black, carbon nanotubes, and carbon fibers. Commercially available products may also be used. Suitable commercially available products include HCF series, MCF series, RCF series, and LFF series (all the products being manufactured by Mitsubishi Chemical Corporation), Vulcan series (manufactured by Cabot Corporation), and Ketjen series (manufactured by Lion Corporation). Here the mean particle diameter means an arithmetic mean diameter as determined by observation of carbon black particles under an electron microscope.

The colored fine particles may be previously subjected to surface treatment from the viewpoint of improving the dispersibility of the colored fine particles in the ionizing radiation curable resin composition. The surface treatment may be, for example, conventional publicly known hydrophilization by silica coating or surface modification by plasma.

The ink composition containing the above ingredients is prepared by mixing a predetermined amount of colored fine particles into an ionizing radiation curable resin composition and, if desired, adding a polymerization initiator and the like. The amount of the colored fine particles added is preferably in the range of 15 to 35% based on the total weight of the ink composition. When the addition amount of the colored fine particles falls within the above-defined range, visibility improvement sheet having a higher contrast can be realized. When the content of the colored fine particles is below the lower limit of the above-defined range, light shielding properties of the wedge-shaped grooves (light absorbing portions) are sometimes unsatisfactory. On the other hand, when the content of the colored fine particles is above the upper limit of the above-defined range, resin beads are likely to come into contact with each other, posing a problem of cracking or chipping.

In the preparation of the ink composition, as described above, the mixing amounts and the types of the respective ingredients can be properly selected so as to provide an ink viscosity of 500 to 5,000 mPa·s.

As described above, the ink composition filled into the groove having a substantially rectangular cross section is cured to form light absorbing portions 5 (FIG. 3B). In this case, the ink composition is cured in such a state that fine air bubbles are randomly dispersed in the filled ink composition. As described later, curing of the ink composition in this state can provide a visibility improvement sheet comprising light absorbing portions, at least one of which contains voids formed of fine air bubbles. As a result, even in the visibility improvement sheet comprising light absorbing portions having a substantially rectangular cross section, a high contrast can be realized while maintaining a left and right view angle. In the present invention, the random means that, in a visibility improvement sheet comprising light absorbing portions and light transparent portions juxtaposed in a direction of the width of the visibility improvement sheet (a direction in which light transparent portions and light absorbing portions are juxtaposed, as shown in FIG. 2A), air bubbles are contained in only given light absorbing portions rather than all the light absorbing portions. Specifically, the random means that, when the cross section in a direction of the width of a visibility improvement sheet is observed at a given position in a longitudinal direction of the sheet, among the plurality of light absorbing portions, some light absorbing portions do not contain air bubbles at all, and air bubble-containing light absorbing portions are randomly present. Accordingly, a visibility improvement sheet comprising light absorbing portions, all of which do not contain air bubbles as a result of observation of the cross section in a direction of the width of the sheet at a given position in a longitudinal direction of the sheet and a visibility improvement sheet comprising light absorbing portions, all of which contain air bubbles is outside the scope of the present invention.

Preferably, the ink composition is cured in such a state that, among air bubbles in the ink, a plurality of fine air bubbles come together into one air bubble. For example, in the cross section of a direction of the width of the visibility improvement sheet, preferably, 1 to 5 fine air bubbles on average are contained in at least one of the grooves having a substantially rectangular cross section. Here 1 to 5 fine air bubbles on average means the average number of air bubbles contained in light absorbing portions determined by averaging measured values of the number of air bubbles contained in individual light absorbing portions that are regarded as containing air bubbles by observation of the cross section in a direction of the width of the light absorbing portions at a given position in the longitudinal direction of the sheet (that is, a direction perpendicular to the direction of the sheet width) and are measured one by one. Accordingly, in calculating the number of air bubbles, light absorbing portions that do not contain air bubbles at all are excluded from the calculation. The number, size and the like of air bubbles in light absorbing portions depend upon not only the viscosity of the ink composition but also the shape of the cross section of light absorbing portions to be formed, that is, the cross-sectional shape of grooves 3. When the viscosity of the ink composition is uniform and, as described above, in the cross section of the grooves, the side surface of the grooves makes an angle to a direction normal to the surface of the visibility improvement sheet, the ink composition is easily filled into the grooves and air bubbles are less likely to be included into the ink composition.

When a plurality of air bubbles are present in one groove, preferably, the ink composition is cured in such a state that the air bubbles are present as discontinuous closed air bubbles. Further, preferably, at least one air bubble is contained in each groove.

The ionizing radiation curable resin in the ink composition can be cured by a conventional curing method, that is, by irradiation with electron beams or ultraviolet light. For example, for electron beam curing, electron beams having an energy of 50 KeV to 1000 KeV, preferably 100 KeV to 300 KeV, and released from various electron beam accelerators such as Cockcroft-Walton accelerators, van de Graaff accelerators, resonance transformer accelerators, insulated core transformer accelerators, linear accelerators, Dynamitron accelerators, and high-frequency accelerators are usable. For ultraviolet curing, for example, ultraviolet light released from light sources such as ultra-high-pressure mercury lamps, high-pressure mercury lamps, low-pressure mercury lamps, carbon arc lamps, xenon arc lamps, and metal halide lamps are usable.

<Visibility Improvement Sheet>

The visibility improvement sheet thus obtained comprises light transparent portions having a substantially rectangular cross section in a sheet thickness direction and light absorbing portions that have a substantially rectangular cross section and are juxtaposed between the light transparent portions. The light transparent portions are elements that have a substantially rectangular cross section and are disposed so that one sheet surface side is an upper side and the other sheet surface side is a lower side. The light absorbing portions are elements that have a substantially rectangular cross section and are provided between the light transparent portions. The light absorbing portions are juxtaposedly arranged so that a surface corresponding to the upper side of the rectangular faces the sheet surface on the upper side of the light transparent portions. Thus, the upper side of the light absorbing portions (gooves filled with the ink composition) and the upper side of the light transparent portions constitute one surface of the visibility improvement sheet. Preferably, the long side of the substantial rectangle in the light absorbing portions has an angle of 0 to 3 degrees to a direction normal to the surface of the visibility improvement sheet. When the angle of the oblique side is close to 0 degree, the cross section is substantially rectangular. When the taper angle exceeds 3 degrees, the ink composition is filled into the grooves more smoothly. As a result, air bubbles are less likely to be included into the ink composition, and, at the same time, the contrast of the visibility improvement sheet is lowered.

Figure 4:
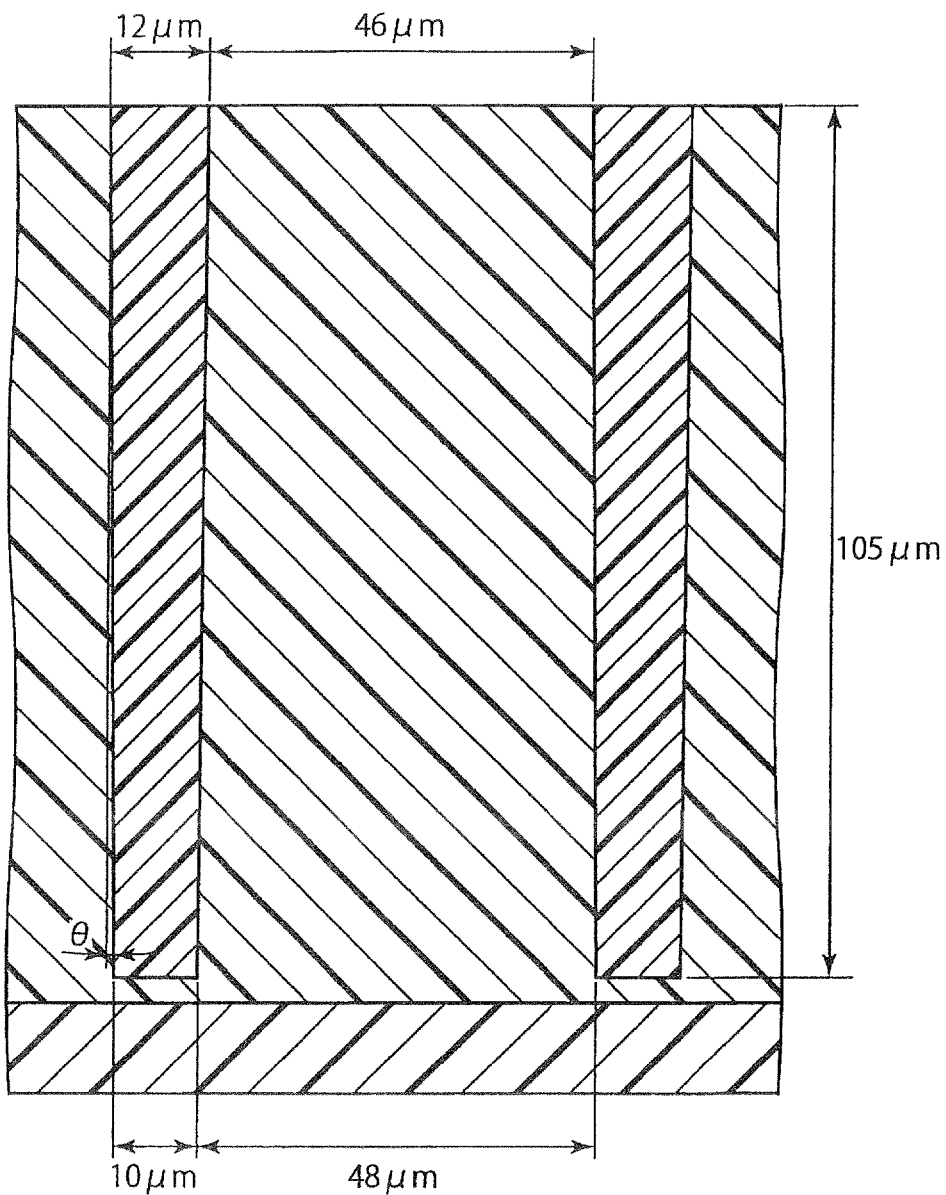
FIG. 4 is an enlarged cross-sectional view in one direction of a prepared visibility improvement sheet.

For example, the visibility improvement sheet may be as shown in FIG. 4, that is, may be a visibility improvement sheet comprising light transparent portions and light absorbing portions that are alternately arranged, one pitch thereof consisting of a light transparent portion having a substantially rectangular cross section that is 105 μm in height, 46 μm in upper side width, and 48 μm in lower side width, and a light absorbing portion having a substantially rectangular cross section that is 12 μm in upper side (that is, opening of the groove) width and 10 μm in lower side width. The thickness (height) of the light transparent portions and the light absorbing portions may be approximately 50 to 150 μm. Preferably, the light absorbing portions have an aspect ratio (that is, an upper side width:depth (thickness) ratio) is approximately 1:6 to 1:11. When the aspect ratio is in the above-defined range, the view angle and the contrast can be realized on a high level.

The light absorbing portions have a refractive index that is the same as or smaller than the refractive index of the light transparent portions. Establishing the above relationship between the light transparent portions and the light absorbing portions can realize proper reflection of image light released from a light source and incident on the light transparent portions under predetermined conditions at a boundary surface between the light absorbing portions and the light transparent portions to provide bright images for viewers. Since part of external light from the viewer side is absorbed, the contrast is improved. Stray light that is not reflected at a boundary surface between the light absorbing portions and the light transparent portions and is incident on the inner side of the light absorbing portions is absorbed by the colored fine particles in the light absorbing portions. Further, external light incident at a predetermined angle from the viewer side can be properly absorbed, contributing to an improved contrast.

In the present invention, voids formed of fine air bubbles are contained in at least one of the light absorbing portions. In light incident on the light absorbing portions in the visibility improvement sheet, the light incident on voids formed of fine air bubbles in the light absorbing portions is passed through the voids or reflected at a boundary surface between the voids and the resin, and, thus, the field of view is brighter than that in visibility improvement sheet comprising void-free light absorbing portions. The number of fine air bubbles contained in at least one of the light absorbing portions is preferably 1 to 5. When the number of air bubbles are excessively large, the view of field is bright, but on the other hand, the contrast is sometimes lowered. Preferably, at least one air bubble is contained in each of the light absorbing portions. Preferably, 1 to 30% by volume of the whole volume of the light absorbing portions is accounted for by the voids from both the viewpoints of the view angle and the contrast.

Two visibility improvement sheets (a first-layer visibility improvement and a second-layer visibility improvement sheet) may be put on top of each other. In this case, the two visibility improvement sheets may also have mutually different structures. For example, the first- and second-layer visibility improvement sheets may be different from each other in width, pitch, depth (depth of wedge-shaped portions), and shape of the light absorbing portions, orientation of the thickness-wise direction of the light absorbing portions, or bias angle of the light absorbing portions to image light (that is, an inclination angle to a horizontal direction). Further, the two visibility improvement sheets may be different from each other in material for the formation of the light absorbing portions (including the type of the resin and the concentration of the colored fine particles). Preferably, for example, the two visibility improvement sheets may be configured to have mutually different function and effect, for example, so that a design on which an importance of efficient cutting-off of external light to improve the contrast is adopted in the first-layer visibility improvement sheet while a design on which an importance of the effect of improving the front brightness by taking advantage of reflection is adopted in the second-layer visibility improvement sheet.

The visibility improvement sheet according to the present invention may further comprise other functional layers adopted in conventional visibility improvement sheets and view angle enlarging members. Specifically, a proper combination of antireflective layers, self-adhesive layers, electromagnetic wave shielding layers, wavelength filter layers, antiglare layers, hardcoat layers and the like may also be used. The order and number of functional layers stacked may be properly determined according to applications of the visibility improvement sheet used.

EXAMPLES

The present invention is further illustrated by the following Examples that are not intended as a limitation of the invention.

Example 1

<Preparation of Ink Composition>

Resin beads obtained by kneading carbon black having a mean particle diameter of 24 nm (RCF#45, manufactured by Mitsubishi Chemical Corporation) into an acrylic resin (Hi-Pearl, manufactured by Nemoto Kogyo K.K.) were used. The amount of carbon black kneaded was 35% by weight based on the acrylic resin. The mean particle diameter of the resin beads was measured with a particle diameter distribution measuring apparatus (LA-920, manufactured by Horiba, Ltd.) and found to be 1.0 μm.

Urethane acrylate (33.6 parts by weight), 14.4 parts by weight of epoxy acrylate, 28 parts by weight of tripropylene glycol diacrylate, 4 parts by weight of methoxytriethylene glycol acrylate, and 240 parts by weight of an acryl difunctional monomer (manufactured by Osaka Organic Chemical Industry Ltd.) as ionizing radiation curable resins were mixed with 4 parts by weight of Irgacure 184 as a photopolymerization initiator. Further, the mixture was further mixed with 21 parts by weight of the resin beads to prepare an ink composition. The viscosity of the ink composition thus obtained was measured under an environment of 25° C. with a Brookfield viscometer and found to be 3,800 mPa·s.

<Preparation of Visibility Improvement Sheet>

Figure 5:
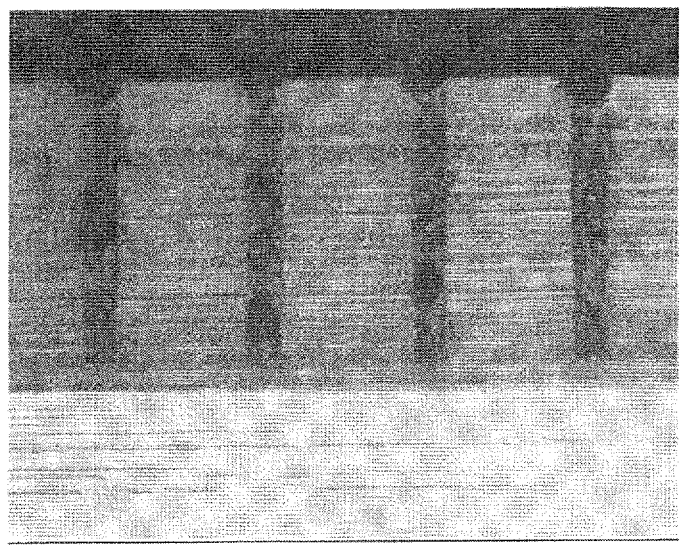
FIG. 5 is an optical photomicrograph of a cross section of the visibility improvement sheet obtained in Example 1.

A urethane ultraviolet curable resin having a refractive index of 1.55 as measured in a cured state was subjected to continuous shaping with a mold on a 100 μm-thick PET base material (A4300, manufactured by Toyobo Co., Ltd.) to form light transparent portions. Subsequently, the ink composition was filled into grooves that had a substantially rectangular cross section and were juxtaposedly provided between the light transparent portions. Excess ink composition was scraped off by a metallic doctor blade, followed by irradiation with ultraviolet light to cure the ink composition and thus to form light absorbing portions. The cross section of the visibility improvement sheet thus obtained was observed under an optical microscope. As a result, the light absorbing portions (grooves) were 12 μm in the opening width of the light absorbing portions (grooves), 10 μm in the width of the groove bottom, 105 μm in depth, and 1.1 degrees in taper angle θ. One void having a diameter of about 3 μm was contained per light absorbing portion, and, in this case, the void ratio was 0.6% by volume. Optical photomicrographs (magnification: 500 times) of the light absorbing portions were as shown in FIG. 5.

Example 2

Figure 6:
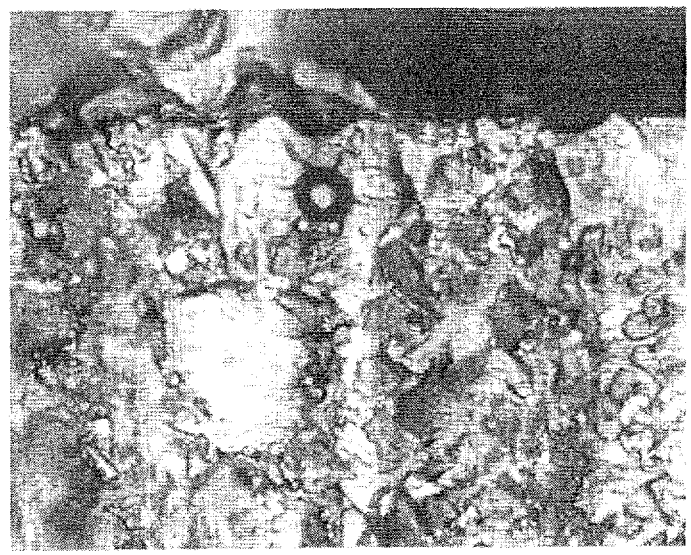
FIG. 6 is an optical photomicrograph of a cross section of the visibility improvement sheet obtained in Example 2.

A visibility improvement sheet was prepared in the same manner as in Example 1, except that the shape of the light absorbing portions was changed and, further, the viscosity of the ink composition was changed to 3000 mPa·s. The cross section of the visibility improvement sheet thus obtained was observed under an optical microscope. As a result, the light absorbing portions (grooves) were 10 μm in the opening width of the light absorbing portions (grooves), 5.5 μm in the width of the groove bottom, 84.6 in depth, and 1.5 degrees in taper angle θ. One void having a diameter of about 5 μm was contained per light absorbing portion, and, in this case, the void ratio was 3% by volume. Optical photomicrographs (magnification: 1000 times) of the light absorbing portions were as shown in FIG. 6.

Example 3

Figure 7:
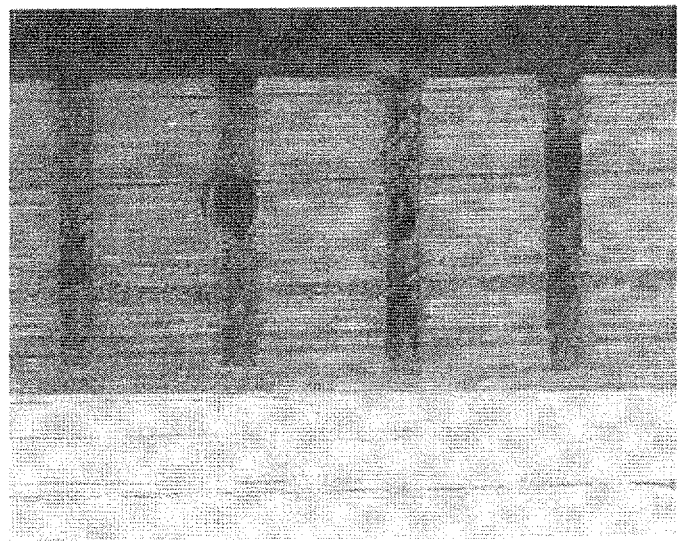
FIG. 7 is an optical photomicrograph of a cross section of the visibility improvement sheet obtained in Example 3.

A visibility improvement sheet was prepared in the same manner as in Example 2, except that the viscosity of the ink composition was changed to 4000 mPa·s. The cross section of the visibility improvement sheet thus obtained was observed under an optical microscope. As a result, the light absorbing portions (grooves) were 10 μm in the opening width of the light absorbing portions (grooves), 5.5 μm in the width of the groove bottom, 84.6 μm in depth, and 1.5 degrees in taper angle θ. One or two voids having a diameter of about 10 μm was contained per light absorbing portion, and, in this case, the void ratio was 24% by volume. Optical photomicrographs (magnification: 500 times) of the light absorbing portions were as shown in FIG. 7.

Comparative Example 1

Figure 8:
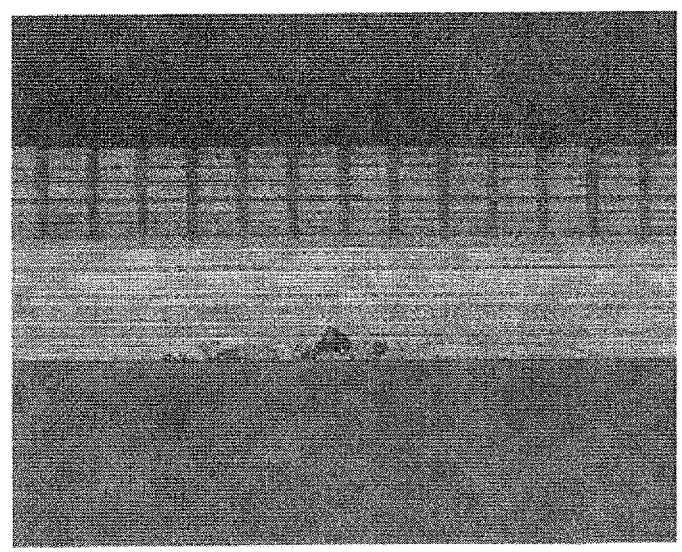
FIG. 8 is an optical photomicrograph of a cross section of the visibility improvement sheet obtained in Comparative Example 1.

A urethane ultraviolet curable resin having a refractive index of 1.55 as measured in a cured state was subjected to continuous shaping with a mold on a 100 μm-thick PET base material (A4300, manufactured by Toyobo Co., Ltd.) to form light transparent portions. Subsequently, the ink composition was coated, by forcing filling of the ink with a rubber roll, into grooves that had a substantially rectangular cross section and were juxtaposedly provided between the light transparent portions. Excess ink composition was scraped off by a metallic doctor blade. Ultraviolet light was applied to cure the ink composition. Thus, light absorbing portions were formed. The cross section of the visibility improvement sheet thus obtained was observed under an optical microscope. As a result, the light absorbing portions (grooves) were 12 μm in the opening width of the light absorbing portions (grooves), 10 μm in the width of the groove bottom, 105 μm in depth, and 1.1 degrees in taper angle θ. Any void was not observed in the formed light absorbing portions. Optical photomicrographs (magnification: 200 times) of the light absorbing portions were as shown in FIG. 8.

<Evaluation of Contrast>

For the visibility improvement sheets thus obtained, the contrast was evaluated by the following evaluation method. At the outset, the brightness of a black screen in a state after the application of the visibility improvement sheet to a display screen, and the brightness of a black screen in a state before the application of the visibility improvement sheet to a display screen were visually observed. The contrast was evaluated according to the following criteria.

⊚: Distinctly higher blackness
○: The same or higher blackness
Δ: Substantially the same blackness
x: Lower blackness The results of evaluation were as shown in Table 1 below.

TABLE 1

|  | Contrast |
| --- | --- |
| Example 1 (voids present) | ⊚ |
| Example 2 (voids present) | ○ |
| Example 3 (voids present) | Δ |
| Comparative Example 1 (voids absent) | ⊚ |

<Measurement of View Angle>

For the visibility improvement sheets, the view angle was measured with a micro-deviation angle brightness meter (GP-500, manufactured by Nakamura Shikisai Gijutsu Kenkyusho).

Regarding measurement conditions, measurement was performed using as a reference a reference piece that gives substantially uniform diffused light at an angle of −80° to +80°, and the view angle was determined from a calculated value obtained by presuming the transmittance of only the reference piece to be 100%. The results were as shown in FIG. 9.

Figure 9:
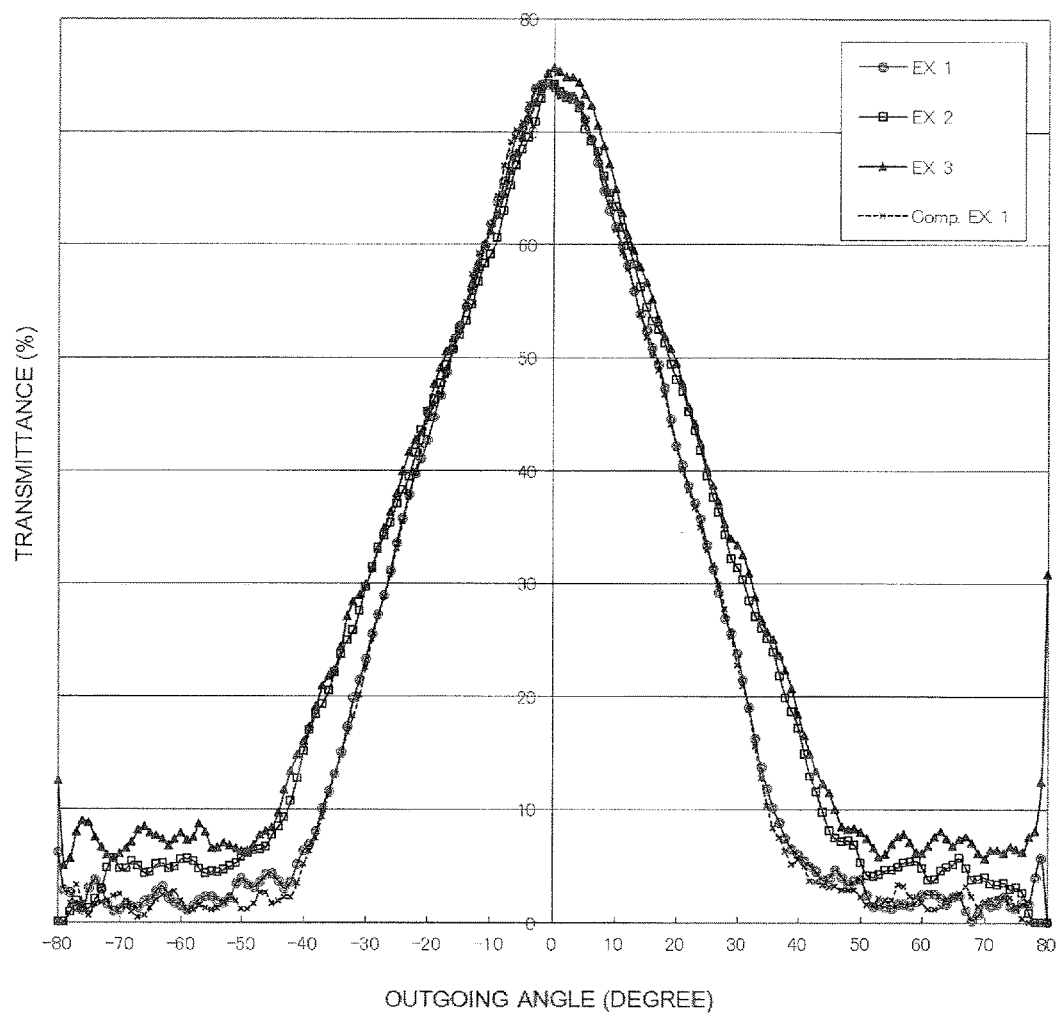
FIG. 9 is a graph showing the results of measurement of view angles for Examples 1 to 3 and Comparative Example 1.

As apparent from Table 1 and FIG. 9, the visibility improvement sheet having predetermined voids in light absorbing portions (Example 1) had a brightness comparable with the void-free visibility improvement sheet (Comparative Example 1) at an outgoing angle of ±40° and exhibited an improved brightness over the void-free visibility improvement sheet at an outgoing angle of ±40° to ±60°. It is apparent that the visibility improvement sheets having predetermined voids in light absorbing portions had a contrast comparable with the void-free visibility improvement sheet.

A comparison of Examples of 1 to 3 shows that the void ratio lowers with a lowering in viscosity of the ink composition or an increase in taper angle of the mold. Further, it is expected that, when the void ratio exceeds 30% by volume, the transmittance at an outgoing angle of ±50° to ±90° is disadvantageously increased, leading to a deteriorated contrast.

DESCRIPTION OF REFERENCE CHARACTERS 1 base material
2 light transparent portion
3 groove
4 colored ink composition
5 light absorbing portion
6 mold
7 coater (die coater)
8 ink scraper

The invention claimed is:

1. A method for manufacturing a visibility improvement sheet comprising light transparent portions juxtaposed to each other at predetermined intervals, and light absorbing portions having a substantially rectangular cross section juxtaposed to each other between the light transparent portions, the method comprising:
    forming light transparent portions juxtaposed to each other at predetermined intervals to form grooves having a substantially rectangular cross section juxtaposed to each other between the light transparent portions;
    filling the grooves with an ink composition comprising a transparent ionizing radiation curable resin composition and colored fine particles to disperse fine air bubbles randomly in the ink composition; and
    curing the ink composition with the fine air bubbles randomly dispersed therein to form the light absorbing portions;
    wherein a width of an opening of the groove is 8 to 12 μm, and wherein the light absorbing portions having a substantially rectangular cross section have an oblique side that makes an angle of 0 to 3 degrees with a direction normal to a surface of the visibility improvement sheet.

2. The method according to claim 1, wherein the fine air bubbles have a mean diameter of 1 to 10 μm.

3. The method according to claim 1, wherein the fine air bubbles are contained in at least one of the grooves having a substantially rectangular cross section in an across-the-width cross section of the visibility improvement sheet.

4. The method according to claim 1, wherein 1 to 5 fine air bubbles are contained in at least one of the grooves having a substantially rectangular cross section in an across-the-width cross section of the visibility improvement sheet.

5. The method according to claim 1, wherein the ink composition is cured in such a state that the fine air bubbles are present as discontinuous closed air bubbles.

6. The method according to claim 1, wherein the colored fine particles are formed of resin beads comprising a resin in which carbon black has been incorporated.

7. The method according to claim 6, wherein the carbon black has a mean particle diameter of 10 to 500 nm.

8. The method according to claim 1, wherein the ionizing radiation curable resin composition comprises compounds selected from the group consisting of polyester resins, polyether resins, acrylic resins, epoxy resins, urethane resins, alkyd resins, spiroacetal resins, polybutadiene resins, polythiolpolyene resins, and oligomers or prepolymers of (meth)acrylates of polyfunctional compounds selected from polyhydric alcohols.

9. The method according to claim 1, wherein the ink composition has a viscosity of 500 to 5,000 mPa·s.

* * * * *